United States Patent [19]
Du

[11] Patent Number: 5,640,384
[45] Date of Patent: Jun. 17, 1997

[54] RECONFIGURABLE COMMUNICATION NETWORK

[75] Inventor: Yonggang Du, Aachen, Germany

[73] Assignee: U.S. Philips Corporation, New York, N.Y.

[21] Appl. No.: 489,471

[22] Filed: Jun. 12, 1995

[30] Foreign Application Priority Data

Jun. 13, 1994 [EP] European Pat. Off. ............ 94201689

[51] Int. Cl.⁶ ..................... H04J 3/14; H04L 12/437; H04Q 7/34
[52] U.S. Cl. ............ 370/221; 370/243; 370/310; 370/431
[58] Field of Search ................ 370/16, 79, 94.3, 370/60, 60.1, 58.1, 58.2, 58.3, 94.1, 94.2, 95.1, 95.3, 16.1, 17; 395/200.12, 200.21

[56] References Cited

U.S. PATENT DOCUMENTS

| | | | |
|---|---|---|---|
| 4,748,658 | 5/1988 | Gopal et al. | 379/221 |
| 4,873,517 | 10/1989 | Baratz et al. | 340/825.03 |
| 4,999,833 | 3/1991 | Lee | 370/94.1 |
| 5,138,615 | 8/1992 | Lamport et al. | 370/94.3 |
| 5,289,461 | 2/1994 | De Nijs | 370/58.1 |
| 5,359,649 | 10/1994 | Rosu et al. | 379/220 |
| 5,412,376 | 5/1995 | Chujo et al. | 370/94.3 |
| 5,509,003 | 4/1996 | Snijders et al. | 370/29 |

FOREIGN PATENT DOCUMENTS

| | | |
|---|---|---|
| 0348327 | 12/1989 | European Pat. Off. . |
| 9307722 | 4/1993 | WIPO . |

OTHER PUBLICATIONS

Paragraph 4.2 of "Practical LANs Analysed" by F.J. Kauffels, Ellis Horwood Limited, Chichester England, 1989.

"Practical LANs Analysed" by F.J. Kauffels, Ellis Horwood Limited, Chichester England, 1989.

Primary Examiner—Douglas W. Olms
Assistant Examiner—Matthew C. Phillips
Attorney, Agent, or Firm—Steven R. Biren

[57] ABSTRACT

The application describes a network comprising transceivers (1..6) linked in a network topology. The positions of the transceivers in the network topology are changed in dependence on the loads on the end-to-end connections (VC1..VC5) between the transceivers in the network. A configuration is chosen to give efficient use of the capacity available in the network. Each time that a new end-to-end connection (VC) within the network is set up the positions of the transceivers (1..6) are changed such that the network remains optimized.

8 Claims, 5 Drawing Sheets

| frequency band | sending transceivers | receiving transceivers |
|---|---|---|
| $f_1$ | 1 | 4 |
| $f_2$ | 4 | 2 |
| $f_3$ | 2 | 5 |
| $f_4$ | 5 | 3 |
| $f_5$ | 3 | 6 |
| $f_6$ | 6 | 1 |

| frequency band | sending transceivers | receiving transceivers |
|---|---|---|
| $f_1$ | 1 | 2 |
| $f_2$ | 2 | 3 |
| $f_3$ | 3 | 4 |
| $f_4$ | 4 | 5 |
| $f_5$ | 5 | 6 |
| $f_6$ | 6 | 1 |

RECONFIGURABLE COMMUNICATION NETWORK

BACKGROUND OF THE INVENTION

The invention relates to a communication network comprising transceivers linked in a network topology. Such a network is for example a network having a ring topology as described in paragraph 4.2 of "Practical LANs Analyzed" by F. J. Kauffels, Ellis Horwood Limited, Chichester England, 1989. A drawback of the network described arises when an end-to-end connection, having a high load, exists between a sending transceiver and a receiving transceiver positioned on different sides of the ring. In this situation the data belonging to this end-to-end connection has to pass all the intermediate transceivers, before arriving at the destination transceiver. Especially when a plurality of such end-to-end connections between transceivers, positioned far away from each other, exists simultaneously, the capacity of the network is not used efficiently.

It is an object of the invention to provide a communication network according to the preamble in which in a given network topology the capacity of the network is used more efficiently.

SUMMARY OF THE INVENTION

Thereto a communication network according to the preamble is characterized in that the network comprises reconfiguration means for obtaining an optimal configuration of the transceivers in the network topology by changing positions of the transceivers in dependence on loads carried by end-to-end connections between the transceivers. An optimal configuration is a configuration in which the transceivers are positioned such that most end-to-end connections use only a low number of links. In this way the capacity of the network is used efficiently.

An embodiment of a communication network according to the invention is characterized in that, the optimized configuration of the transceivers in the network topology is obtained by optimizing a load weighted sum of frequency utilisation factors of the end-to-end connections in the network. The frequency utilisation factor of an end-to-end connection is the inverse value of the number of links needed for the end-to-end connection. Because the sum is load weighted the end-to-end connections having a higher load have a larger influence on the sum than those with a smaller load. The share that the frequency utilization factor of a certain end-to-end connection has on the total sum is increased when the number of links of the end-to-end connection is decreased. The sum thus has a high value for configurations in which the end-to-end connections with high loads use only one link i.e. when the sending and the receiving transmitter belonging to such an end-to-end connection are positioned next to each other.

A further embodiment of a communication network according to the invention is characterized in that, the transceivers are arranged for radio communication with each other and in that the reconfiguration means comprise channel allocation means for allocation of radio channels to the transceivers, which allocation means are arranged for changing the positions of the transceivers by changing the allocation of radio channels to the transceivers. In this way changing the positions of the transceivers is carded out very easily.

A further embodiment of a communication network according to the invention is characterized in that the transceivers are arranged for communication with each other using ATM-packets.

When ATM (Asynchronous Transfer Mode) is used in a system, user information, for example, telephone, picture or sound signals is put in blocks of fixed lengths. A block of fixed length is denoted as a cell, which contains 53 bytes. Each cell contains a header field having a length of 5 bytes, and an information field which accommodates the user information and has a length of 48 bytes. In such a header field are available routing identification codes, error recognition data and control data. Routing identification codes are for example end-to-end connection identifiers. Such an identifier, also referenced VCI (Virtual Channel Identifier), contains the description of the destination of the cell in the system. For transmitting a cell a Virtual Channel (VC) is made available on account of the Virtual Channel Identifier. A trunk group of various Virtual Channels is referenced a Virtual Path. A virtual path is identified by a Virtual Path Identifier (VPI).

When the transceivers in the network communicate with each other using ATM-packets switching functions can be carried out by the transceivers in a very easy way. Every packet can be treated separately on basis of its cell header.

A further embodiment of a communication network according to the invention is characterized in that the reconfiguration means are arranged to change the positions of the transceivers when an end-to-end connection is set up or broken down. When end-to-end connections are set up or ended the situation in the network changes and an adjustment of the configuration of the transceivers in the network topology is needed.

A further embodiment of a communication network according to the invention is characterized in that, the transceivers are arranged for sending signalling information to the reconfiguration means about setting up and breaking down end-to-end connections and about the load on end-to-end connections. In this way the reconfiguration means directly get information about the traffic situation in the network.

BRIEF DESCRIPTION OF THE DRAWINGS

The invention is further explained with reference to a drawing, in which.

DETAILED DESCRIPTION OF THE PREFERRED EMBODIMENTS

Figure 1:
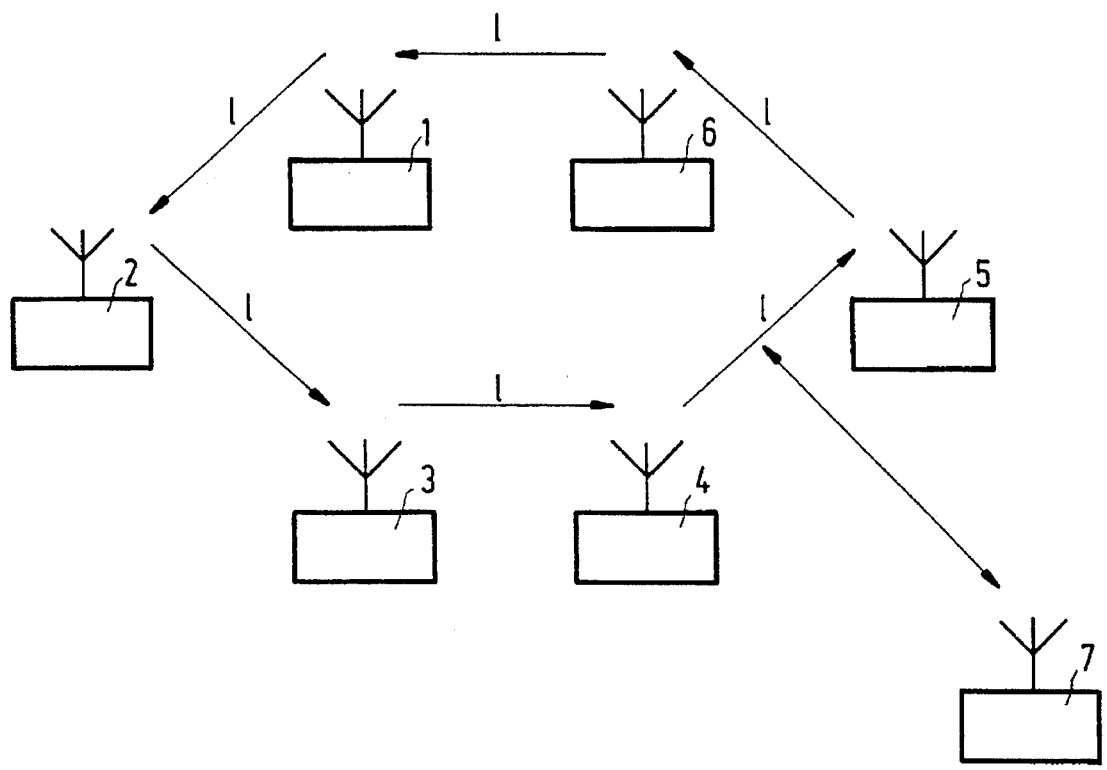
FIG. 1 shows a communication network in which the transceivers are configured in a ring topology and communicate via radio links.

FIG. 1 shows a communication network in which the transceivers 1..6 are configured in a ring topology. The communication channel between two neighbouring transceivers is called a link 1. Communication in the ring is unidirectional. The transceivers can be each connected to a station. In a wireless network, however, it is advantageous to integrate the transceiver and the station into the same housing. A station can be for example: a telephone, a videophone, a personal computer, a television, an audiotuner etc. The transceivers communicate with each other via radio channels. They send their information in the form of ATM-cells with a fixed length. An ATM-cell comprises a header with a length of 5 bytes and a user-information field of 48 bytes. In such a header are available routing identification codes, error recognition data and control data. Routing identification cedes are for example end-to-end connection identifiers. Such an identifier, also referenced VCI (Virtual Channel Identifier), contains the description of the destination of the cell in the system. For transmitting a cell a Virtual Channel (VC) is made available on account of the Virtual Channel Identifier. A trunk group of various Virtual Channels is referenced a Virtual Path. A virtual path is identified by a Virtual Path Identifier (VPI).

A radio frequency manager 7 communicates via radio signalling channels with the transceivers. It allocates radio channels to the transceivers in the ring. This can be done in FDMA: i.e. each transceiver gets its own frequency band to communicate with the neighbouring transceiver in the ring. Also TDMA is possible: In a certain time frame each transceiver gets access to one or more time slots to communicate with the neighbouring transceiver. Channel allocation on basis of TDMA is described in more detail in the copending German Patent Application 43 43 839.3 of the applicant. Also allocation of radio channels using CDMA is possible.

Figure 2A:
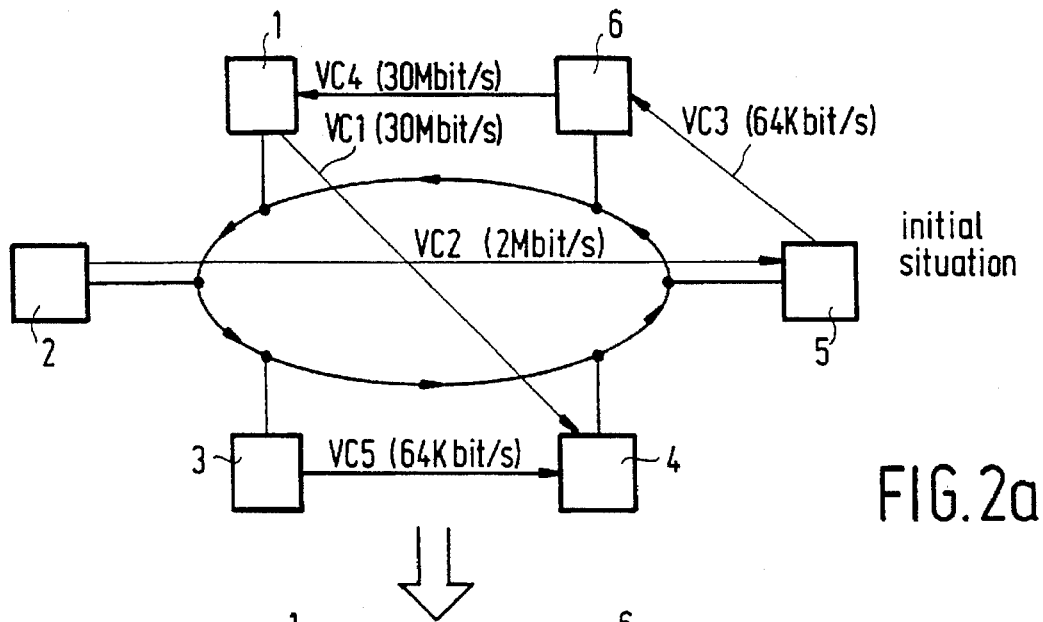
FIG. 2a shows the communication network in which some existing end-to-end connections are indicated.

FIG. 2a shows the communication network in which some existing end-to-end connections are indicated. In ATM those connections are called Virtual Channels (VC). For every Virtual Channel the mean load is given. In FIG. 2 five virtual channels (VC) exist. VC1 from transceiver 1 to transceiver 4, mean load is 30 Mbit/s. VC2 from transceiver 2 to transceiver 5, mean load is 2 Mbit/s. VC3 from transceiver 5 to transceiver 6, mean load is 64 kbit/s. VC4 from transceiver 6 to transceiver 1, mean load is 30 Mbit/s. VC5 from transceiver 3 to transceiver 4, mean load is 64 kbit/s. The number of needed radio links for VC 1 is 1, the number of needed radio links for VC2 is 3, the number of needed radio links for VC3 is 1, the number of needed radio links for VC4 is 3, the number of needed radio links for VC5 is 1. For every virtual channel $VC_i$ a frequency utilization $q_i$ can be defined. $q_i$ is related to the number of radio links $N_i$ between the sending transceiver and the receiving transceiver in the following manner:

$$q_i = 1/N_i \tag{1}$$

Now a load weighted sum S of the frequency utilization factors of all the virtual channels in the communication network can be calculated:

$$S = \left( \sum_i M_i q_i \right) / \left( \sum_j M_j \right) = \left( \sum_i \frac{M_i}{N_i} \right) / \left( \sum_j M_j \right) \tag{2}$$

in which $M_i$ is a mean load for a virtual channel $VC_i$, $N_i$ is the number of needed links and $\Sigma M_j$ is the sum of the mean loads of all end-to-end connections in the communication network. The sum S is a measure for the efficiency of the use of available capacity in the communication network. The sum S of the configuration is 0.66. It is clear that the available capacity in the network in the configuration as in FIG. 2a is not used very efficiently. VC4 which has a mean load of 30 Mbit/s needs 3 radio links, while VC3 and VC5 with a much smaller mean load need only 1 radio link each.

The radio frequency manager 7 every time that a connection is set up or ended, receives this information via the radio signalling channel from the transceivers. When a new connection is set up the radio frequency manager 7 gets the expected mean load of this connection from the transceiver. Only in these situations the radio frequency manager 7 has to change positions of the transceivers. The radio frequency manager 7 can for example calculate the sum S for every configuration of all the transceivers in the ring. It then chooses the configuration which results in the highest value of S. Especially when the ring has a lot of transceivers and when a lot of virtual channels exist these calculations can take a considerable amount of time. Then a faster optimization procedure could be followed. The radio frequency manager 7 then starts to optimize the network as follows: The transceivers of the virtual channel with the highest mean loads and the lowest frequency utilization factors are placed next to each other. The sum S is calculated for this configuration. When S is larger than in the previous situation, improvement is achieved. Then for the transceivers with the next largest mean load the process is repeated. This will continue until no improvement can be made any more.

Figure 2B:
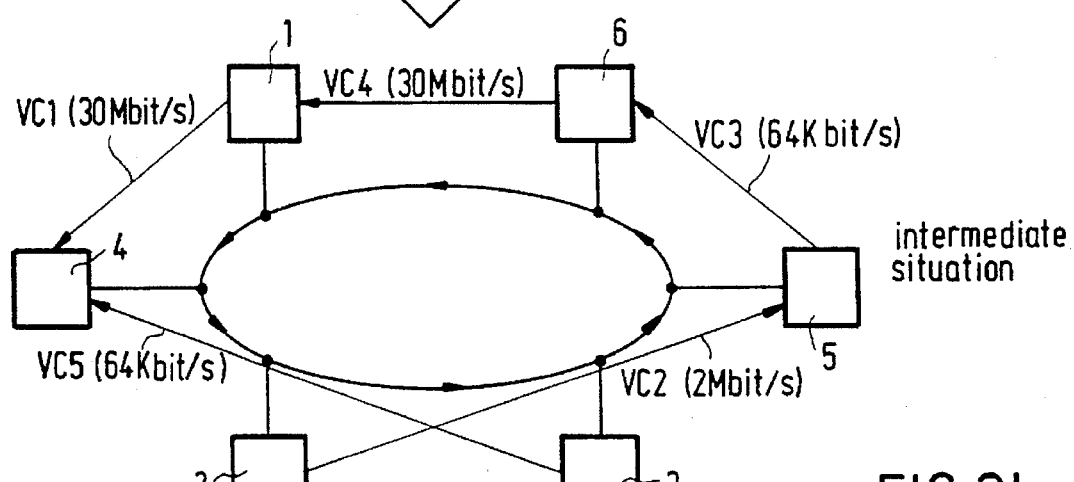
FIG. 2b shows the communication network when some transceivers are changed in position, leading to a more efficient use of available capacity.
Figure 2C:
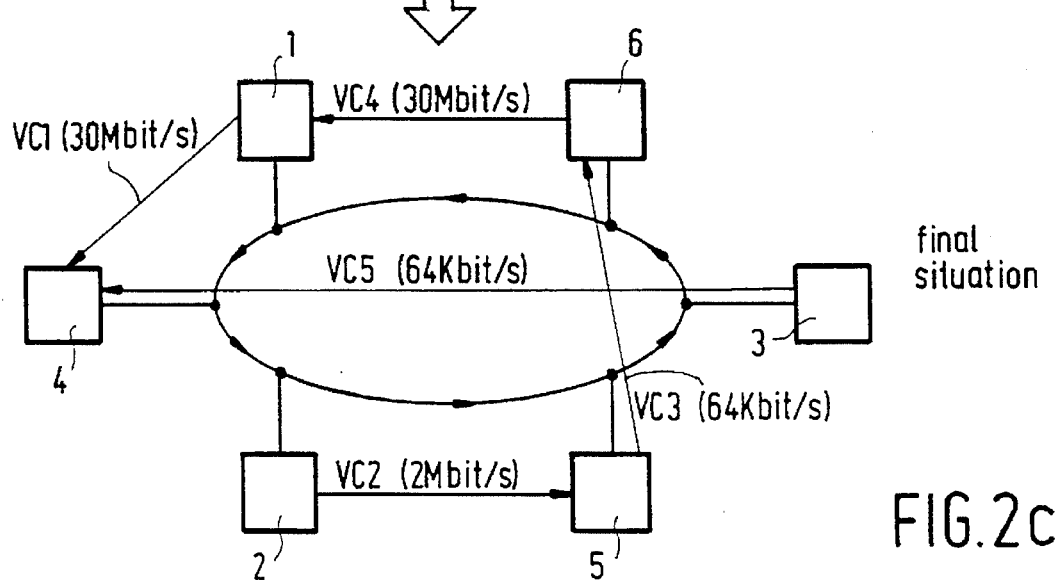
FIG. 2c shows the communication network in the best configuration.

This procedure is now further explained: In the initial situation of FIG. 2a the virtual channel with the highest mean load and the lowest frequency utilization factor is VC1. This means that transceivers 1 and 4 should become neighbours. Transceiver 1 is maintained on its position, because VC4 with also a high mean load has a frequency factor of 1, so transceiver 6 and 1 should remain neighbours. So, transceiver 4 is placed next to transceiver 1 while the mutual positions of the other transceivers remain unchanged. This situation is shown in FIG. 2b. The value of S is improved. Now it has to be determined if further improvement is possible. Therefore transceiver 2 and 5 belonging to VC2 are brought closer together. The result is shown in FIG. 2c. The sum S is further improved. In the configuration of FIG. 2c no further improvement can be reached. Putting the transceivers belonging to VC3 or VC5 close together would have as a result that the frequency factor of VC1 and VC4 is decreased. Since those two virtual channels have a much higher mean load this would lead to a deterioration of the efficiency of the whole network. The sum S would decrease. The fast optimization procedure described here is only one of the possibilities to optimize the network configuration. In case of lack of time to calculate the optimal configuration, also a configuration can be used in which the capacity of the network is used efficiently already, although it is not the best configuration. For example the situation of FIG. 2b is already very satisfactory and could under theses circumstances very well be used.

Table 1 shows the values of S belonging to FIG. 2a till FIG. 2c respectively.

TABLE 1

| | |
|---|---|
| FIG. 2a | S = 0.6566 |
| FIG. 2b | S = 0.9834 |
| FIG. 2c | S = 0.9988 |

Figure 3B:
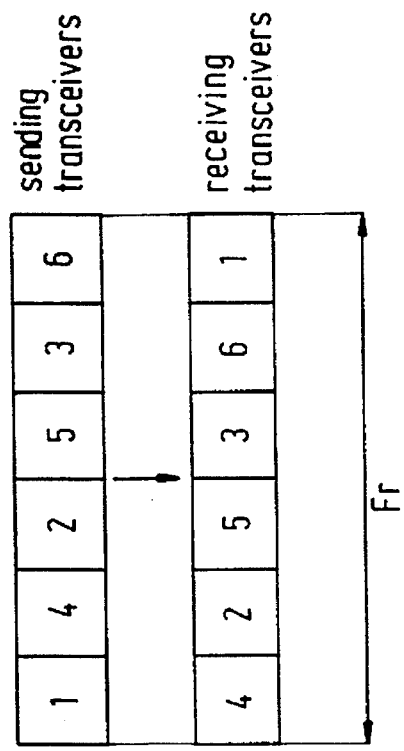
FIG. 3a shows radio channel allocation in TDMA for the communication network in the configuration of FIG. 2a, FIG. 3b shows radio channel allocation in TDMA for the communication network in the configuration of FIG. 2c.
Figure 3A:
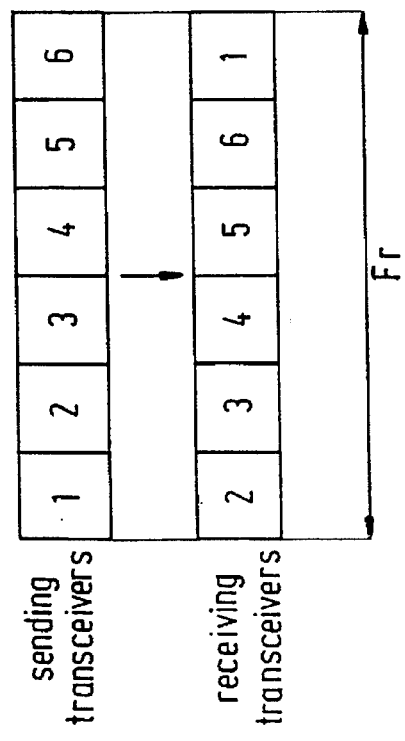

FIG. 3 shows how the positions of the transceivers can be changed when the radio network is working according to the TDMA-principle. FIG. 3a shows a time frame Fr, which exists of 6 time slots. In each time slot one transceiver is allowed to send and its neighbouring time slot is allowed to receive. FIG. 3a shows the time slot allocation for the situation in FIG. 2. The radio frequency manager 7 can change the positions of the transceivers in the network very easily by changing the allocation of the time slots. FIG. 3b shows the time slot allocation for the situation of FIG. 2c.

Figures 4A, 4B:
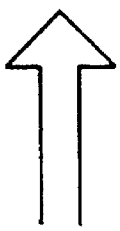
FIG. 4a shows radio channel allocation in FDMA for the communication network in the configuration of FIG. 2a, FIG. 4b shows radio channel allocation in FDMA for the communication network in the configuration of FIG. 2c.

FIG. 4 shows how the positions of the transceivers can be changed when the radio network is working according the FDMA-principle. FIG. 4a shows the allocation of frequency bands for the situation of FIG. 2a. The frequency manager can change the positions of the transceivers in the network very easily by changing the allocation of the frequency bands. FIG. 4b shows the frequency band allocation for the situation of FIG. 2c.

Communication of signalling information between the radio frequency manager 7 and the transceivers 1..6 may take place using additional time slots or an additional frequency band.

Figure 5:
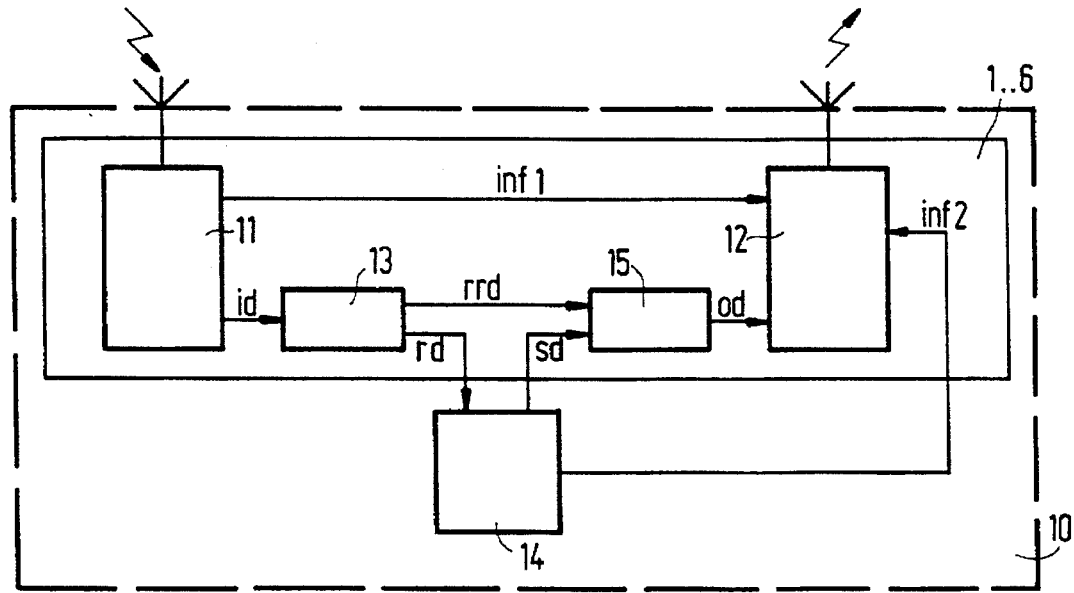
FIG. 5 shows a transceiver to be used in the network having the ring topology.

FIG. 5 shows a block diagram of a transceiver 1..6 capable of operating in an ATM radio ring. The way of operation of the transceiver is here described in a TDMA system. How to adapt the transceiver to an FDMA-system should be clear to a person skilled in the art. The transceiver comprises a radio receiving part 11, a radio transmitting part 12, a demultiplexer 13 and an output buffer 15. It is connected to a station 14. The transceiver and the station are integrated in the same housing 10. The radio receiving part receives signalling information from the radio frequency manager 7. This information identifies the time slots in which the transceiver has to receive data from another transceiver and the time slots in which the transceiver is allowed to send data. This last part of the information about the allocation of the time slots in which the transceiver is allowed to send inf1 is sent to the radio transmitting part. The radio receiving part further receives all the incoming cells id from the neighbouring transceiver and transmits them to the demultiplexer 13. The demultiplexer sends the incoming cells rd intended for the station 14 to the station 14 and all the cells which have to be transferred trd to the output buffer. It does this on basis of the address information in the cell header (VCI). The cells that the station wants to send sd also go to the output buffer 15. All the cells of the output buffer 15 together are the outgoing cells od. Those are sent to the next transceiver in the time slots that are indicated by the radio frequency manager 7. When the station 14 wants to set up a new connection it sends signalling information inf2 about the mean load and the address information of the destination station via the radio transmitting part to the radio frequency manager 7. It also sends signalling information inf2 to the radio frequency manager 7 about breaking down of connections. Each time when a new connection is set up or broken the frequency manager checks whether the positions of the transceivers are optimal for the current situation. When the positions are not optimal the radio frequency manager 7 calculates which are the optimal positions of the transceivers for the new situation and changes the positions of the transceivers as described here above.

Figure 6A:
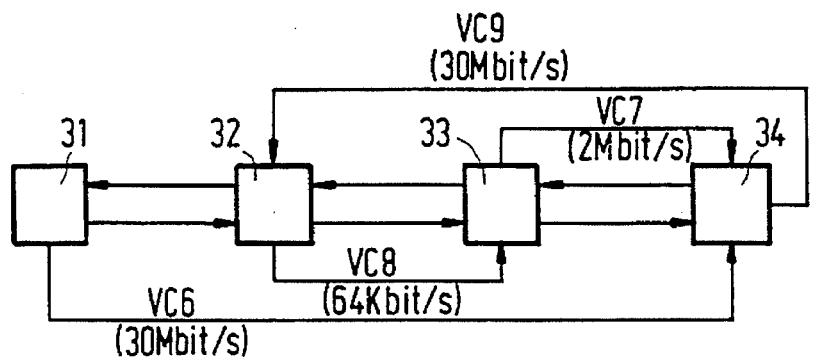
FIGS. 6a and 6b show a communication network in which the transceivers are linked in a chain topology.
Figure 6B:
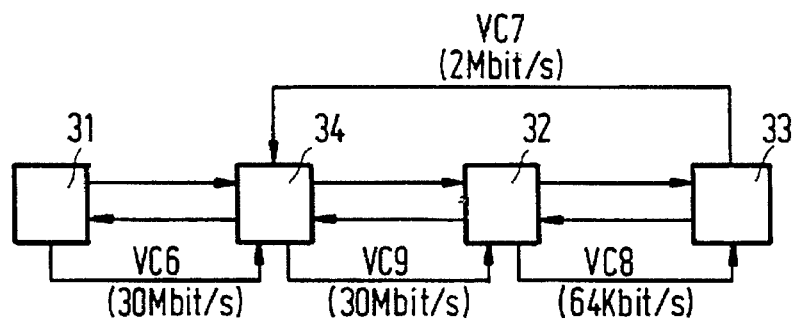

FIG. 6 shows schematically an ATM-network using radio links in which the transceivers 31,32,33,34 are linked in a chain topology. In FIG. 6 four virtual channels exist. VC6 from transceiver 31 to transceiver 34, mean load is 30 Mbit/s. VC7 from transceiver 33 to transceiver 34, mean load is 2 Mbit/s. VC8 from transceiver 32 to transceiver 33, mean load is 64 kbit/s. VC9 from transceiver 34 to transceiver 32, mean load is 30 Mbit/s. The number of needed radio links for VC6 is 3, the number of radio links needed for VC7 is 1, the number of needed radio links for VC8 is 1, the number of radio links needed for VC9 is 2. Obviously the available capacity in the network is not used efficiently. The optimized configuration for the transceivers in the chain topology is shown in FIG. 6b. The two Virtual Channels having the highest mean loads VC6 and VC9 both use only one radio link between source and destination transceiver. The configuration of FIG. 6b cannot be improved any more. Table 2 shows the values of the weighted sum S of frequency utilization for the situations shown in FIG. 6a and 6b respectively.

TABLE 2

| FIG. 6a | S = 0.4361 |
| FIG. 6b | S = 0.9839 |

Figure 7:
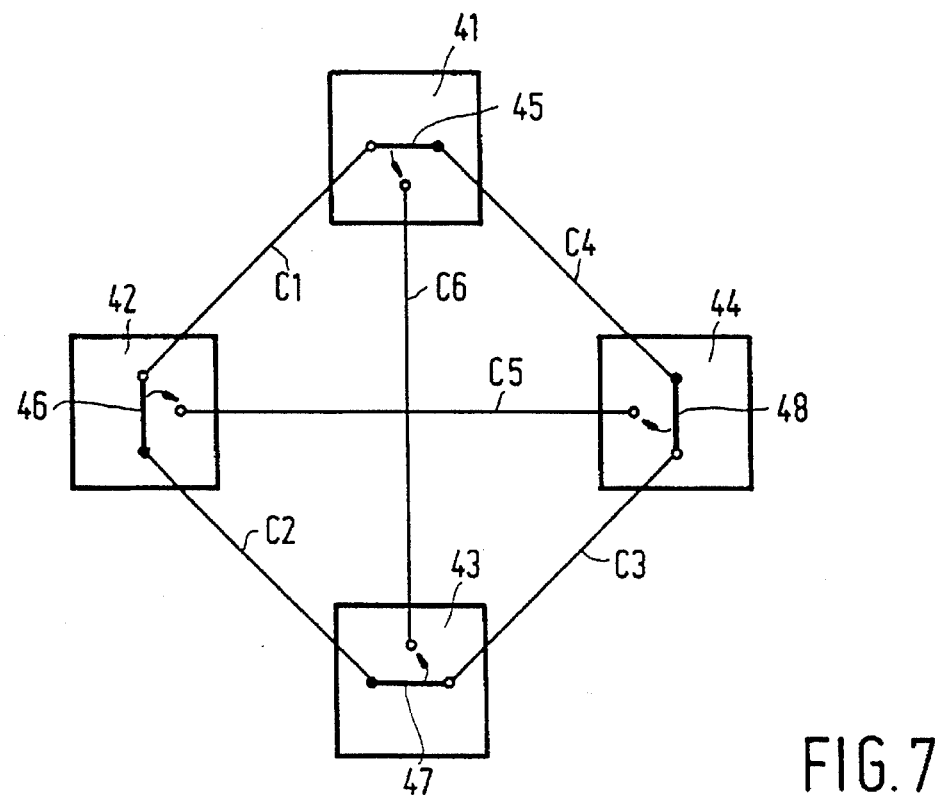
FIG. 7 shows a communication network in a ring topology in which the transceivers are linked by cables.

FIG. 7 shows a communication network in a ring topology in which the transceivers 41..44 are linked by cables C1..C6. The transceivers comprise switches 45..48. When the switches are in the state as indicated in the figure, the transceivers are linked in a ring topology, in the following consecutive order: 41-42-43-44-41. When all the switches 45..48 are in the other state from that indicated in the figure, the transceivers remain linked in a ring topology but the consecutive order of the transceivers is changed: 41-43-42-44-41. So, using the switches 45..48 the positions of the transceivers in the ring topology are changed. The present invention is in this way also applicable in wired networks.

What is claimed is:

1. Communication network comprising transceivers (1..6) linked in a network topology, and reconfiguration means (7) for obtaining an optimal configuration of the transceivers (1..6) in the network topology by changing positions of the transceivers in the network in dependence on loads carried by end-to-end connections (VC1..VC5) between the transceivers (1..6) and the number of links associated with said end-to-end connections.

2. Communication network according to claim 1 in which the optimized configuration of the transceivers in the network topology is obtained by optimizing a load weighted sum of frequency utilisation factors of the end-to-end connections (VC1..VC5) in the network.

3. Communication network according to claim 1, in which the transceivers (1..6) are arranged for radio communication with each other and the reconfiguration means (7) comprises channel allocation means for allocation of the radio channels to the transceivers, (1..6) by changing the allocation of radio channels to the transceivers (1..6).

4. Communication network according to claim 1 characterized in that, the transceivers (1 ..6) are arranged for communication with each other using ATM-packets.

5. Communication network according to claim 1 characterized in that, the reconfiguration means are arranged to change the positions of the transceivers (1..6) when an end-to-end connection (VC1 ..VC5) is set up or broken down.

6. Communication network according to claim 1 characterized in that, the transceivers (1..6) are arranged for sending signalling information (inf2) to the reconfiguration means (7) about setting up and breaking down end-to-end connections and about the load on end-to-end connections.

7. Transceiver (1..6) for use in a network according to claim 1, characterized in that, the transceiver (1..6) is arranged for sending signalling information (inf2) to the reconfiguration means (7) about setting up and breaking down end-to-end connections and about the load on end-to-end connections.

8. Reconfiguration arrangement (7) for use in a network according to claim 1 in which the reconfiguration (7) means is arranged for obtaining an optimal configuration of the transceivers (1..6) in dependence on loads on end-to-end connections (VC1..VC..5) between the transceivers (1..6).

* * * * *